UNITED STATES PATENT OFFICE.

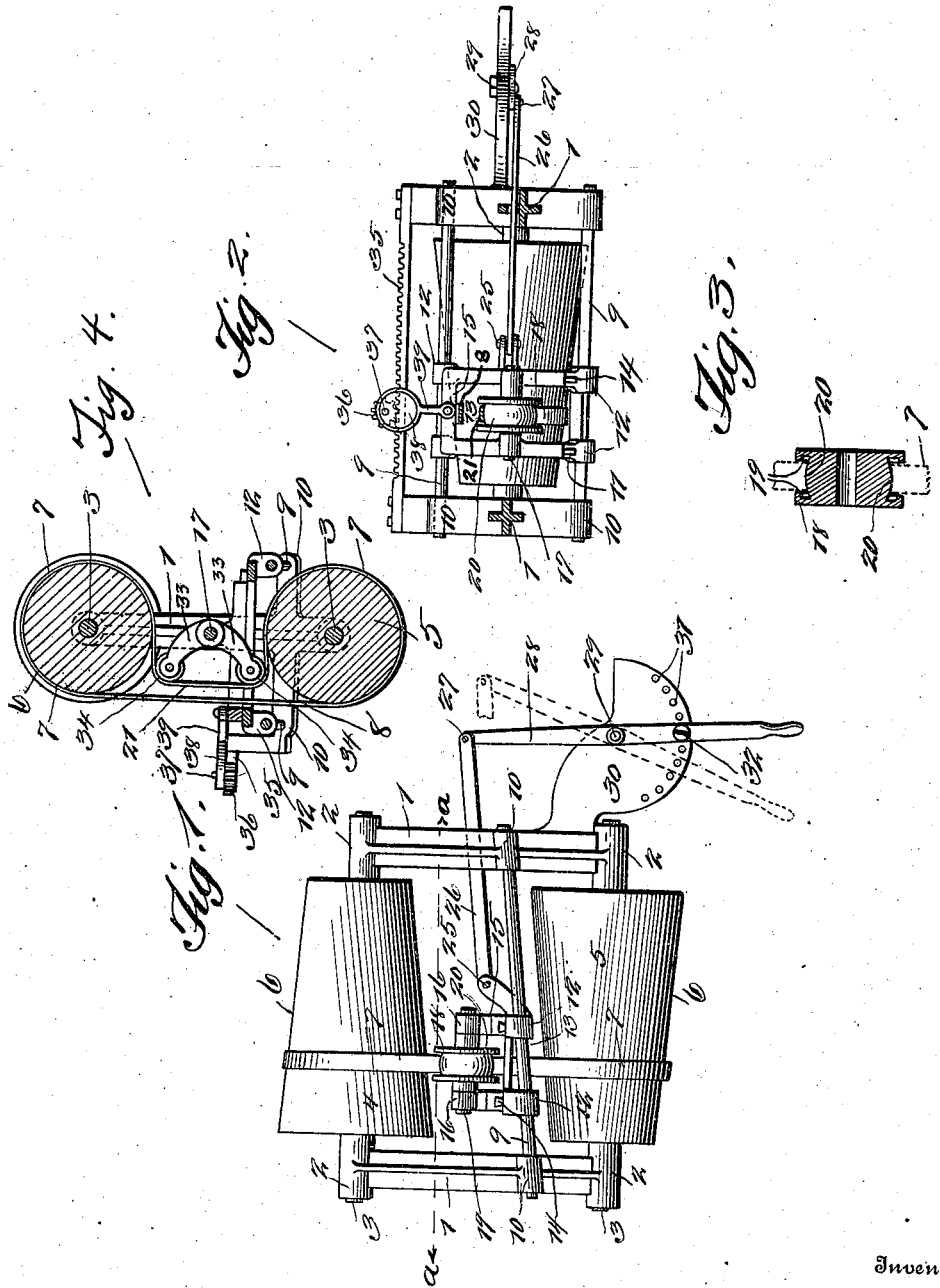
No. 847,695. PATENTED MAR. 19, 1907.
E. RICHTER.
VARIABLE SPEED TRANSMITTING DEVICE.
APPLICATION FILED APR. 17, 1905.

ERNST RICHTER, OF CINCINNATI, OHIO.

VARIABLE-SPEED-TRANSMITTING DEVICE.

No. 847,695. Specification of Letters Patent. Patented March 19, 1907.

Application filed April 17, 1905. Serial No. 255,935.

*To all whom it may concern:*

Be it known that I, ERNST RICHTER, a citizen of the United States of America, and a resident of Cincinnati, in the county of Hamilton and State of Ohio, have invented certain new and useful Improvements in Variable - Speed - Transmitting Devices, of which the following is a specification.

This invention relates to certain improvements in variable-speed-transmitting devices, and particularly in that class of such devices wherein are employed oppositely-arranged conoidal pulleys around which is passed a band or belt capable of movement in the direction of the length of said pulleys, so that by such movement of the band or belt one of said pulleys may be driven at different speeds from the other; and the object of the invention is to provide a transmitting device of this general character wherein the band or belt is afforded a greater arc of contact or extent of bearing around the circumference of the pulleys, so that narrower belts or bands may be employed without lessening of efficiency and wherein are provided improved means for preventing such band or belt from "creeping" during the operation of the transmitting mechanism lengthwise along the pulleys, whereby this defect, which is present in this description of transmitting devices as ordinarily constructed, is altogether avoided.

The invention consists in certain novel features of the construction, combination, and arrangement of the several parts of the improved transmitting device whereby certain important advantages are attained, all as will be hereinafter fully set forth.

The novel features of the invention will be carefully defined in the claims.

In the accompanying drawings, which serve to illustrate my invention, Figure 1 is a side elevation of an improved transmitting device constructed according to my invention, and Fig. 2 is a transverse section taken through the same in the plane indicated by line *a a* in Fig. 1. Fig. 3 is a sectional detail view showing the shifting or intermediate sheave or pulley detached. Fig. 4 is a vertical sectional view showing the construction and arrangement of the intermediate or shifting pulley or sheave and its supporting means as constructed according to a modified form of the device.

Referring first to Figs. 1, 2, and 3, 1 1 indicate the oppositely-located arms or portions of a bearing-frame of any desired kind, and which have alined bearings 2 2 at opposite ends, said arms or frame portions 1 1 being spaced apart, so that said bearings 2 2 may receive the opposite ends of shafts 3 3, which are parallel with each other and whereon are secured the respective oppositely-arranged cone-pulleys 4 and 5, the arrangement of which is such that their tapers are opposite to each other.

The cone-pulleys 4 and 5 have convex peripheral bearing-surfaces 6 6, the adjacent sides of which, as seen in Fig. 1, have a substantially parallel direction and are spaced apart from each other, so that there is afforded between such adjacent substantially parallel sides of the pulleys an opening the general direction of which is at an inclination to the axes of the pulley-shafts 3 3 and wherein are adapted to be received certain intermediate parts, which will be hereinafter described and which are capable of adjustment along said diagonal space in a direction parallel with the adjacent parallel sides of said pulleys.

7 indicates a narrow band or belt of annular or endless character, which is passed around the peripheral bearing-surfaces 6 6 of the respective cone-pulleys 4 and 5 and which has one of its runs, as shown at 8, extended directly at a tangent from and between said bearing-surfaces 6 6. In ordinary constructions of this type of transmission apparatus each bight of said endless band or belt has engagement around substantially one hundred and eighty degrees of the circumference of each of the pulleys 4 and 5, and by reason of such limited engagement of the band or belt with said pulleys a narrow band or belt can be employed only where comparatively light mechanisms are to be driven from the transmission apparatus.

9 9 indicate parallel guide rods or bars which are extended diagonally between the frame parts 1 1 and along the space between the adjacent sides of the pulleys in directions parallel with said adjacent pulley faces or sides, the extremities of said guide rods or bars 9 9 being held in arms 10 10, oppositely directed from the frame parts 1 1, as seen in Fig. 2, and 11 indicates an auxiliary frame or carriage formed of connected spaced side portions having perforated lugs 12 12 for sliding engagement and movement lengthwise upon the guide bars or rods 9 9, the side portions of said auxiliary frame or carriage being so spaced from each other as to produce between them a central opening 13, through which the direct run or side 8 of the band or belt 7 is passed, as seen in Fig. 2.

The side portions of the auxiliary frame or carriage 11 have parallel undercut guideways 14 14, between which is held to slide in a direction transverse to the length of the guide bars or rods 9 9 a bracket 15, having oppositely-arranged bearings wherein are held, as seen at 16, the ends of a shaft or stud 17, on which the intermediate or shifting pulley or sheave 18 is carried, said intermediate sheave or pulley having a grooved peripheral surface 20 of convex cross-section and of sufficient width to receive the belt or band 7 and having flanges 19 19 at opposite sides of said convex surface and provided with annular grooves or recesses in their inner surfaces to provide guides for said band or belt 7 and prevent the latter from slipping off laterally in passing around said intermediate pulley.

25 represents a lug formed on the auxiliary frame or carriage 11, and 26 is a link, one end whereof is connected with said lug 25, while its opposite end has connection, as seen at 27, with a lever 28, pivotally mounted, as seen at 29, upon a segment 30 on one of the frame portions 1 and provided with a series of apertures 31 in concentric arrangement with the pivotal point 29 of lever 28 and adapted to receive a pin or screw 32, carried by said lever, for holding said lever 28 in adjusted position upon the frame. When said screw or pin 32 is removed, lever 28 may be swung pivotally, and its movement will be communicated, by means of link 26, to the auxiliary frame or carriage 11, carrying the intermediate sheave or pulley 18, whereby said carriage and intermediate sheave or pulley will be moved in a path along the inclined guide-rods 9 and parallel with the inclinations of the peripheral bearing-faces 6 of the pulleys 4 and 5, the engagement of the undercut flanges 19 of said sheave or pulley 18 with the narrow belt or band at its side or run 21 opposite to the run 8, which passes direct between the pulley-faces, serving in such movement of the sheave or pulley 18 to move said band or belt lengthwise along the pulley-faces, so as to accomplish the desired speed variation, after which by again inserting the screw or pin 32 in the appropriate aperture 31 of segment 30 the parts may be held against accidental movement from the desired adjustment.

As herein shown, when the intermediate sheave or pulley 18 is adjusted so that its axis stands in the same plane with the axes of shafts 3 3, on which the conoidal pulleys 4 and 5 are held, whereby one side of the rounded face 20 of said intermediate sheave or pulley is brought into proximity with the run or side 8 of belt or band 7, which is passed directly between the bearing-faces 6 6 of pulleys 4 and 5, and the other side or run 21 of the band or belt 7 is carried inwardly between the pulleys 4 and 5 and is passed around the side of the intermediate sheave or pulley 18, which is adjacent to said direct run 8 of the belt or band, whereby, as shown in Fig. 2 of the drawings, the terminal bights of the belt or band, which are passed around the pulleys 4 and 5, are caused to contact with a greater arc of each pulley-face than is possible where, as in ordinary forms of this type of transmission apparatus, both sides or runs of the belt or band are passed directly across the space between the pulleys as is the side or run 8. By the particular arrangement of the parts herein shown the belt or band has driving engagement upon the inner or adjacent parts of the tapered pulley-faces, so that instead of said belt or band having engagement around only about one hundred and eighty degrees of the driving-face of each pulley 4 and 5, as in ordinary constructions, the driving engagement of the band or belt is extended and increased to cover substantially two hundred and forty degrees of the peripheral face of each of said pulleys.

Where a greater arc of engagement of the band or belt with the pulleys 4 and 5 is desired than is afforded by the construction above described, the arrangement shown in Fig. 4 may be employed. In this form the bracket 15 will be provided with upwardly and downwardly extended arms 33, each of which carries a small pulley 34, grooved for engagement with the belt 7, which is thereby caused to engage upon the pulleys 4 and 5 around arcs much greater than in the construction shown in the other figures, the rear run of the belt being drawn up closely adjacent and parallel with the direct run or side 8.

In this class of transmission apparatus there has heretofore been present a feature of great disadvantage, due to the creeping of the band or belt endwise upon the pulleys, whereby the apparatus is rendered altogether unfit for employment where accurate speed changes are desirable. This creeping of the band or belt is due to the taper of the cone-pulleys, which tend to impart two different speeds to the two edges of the band or belt, and it will be obvious that the greater the width of the band or belt the greater will be the difference in speed imparted at the two edges thereof, and consequently the greater will be the creeping effect produced thereby. Where narrow bands or belts are employed, the creeping upon the pulleys is much less than in the case of wider bands or belts; but it will be apparent that in ordinary constructions, where the bights of the band or belt are engaged around only substantially half the perimeters of the cone-pulleys, the employment of very narrow belts or bands is in most cases rendered impossible on account of the reduced driving power afforded thereby.

Where the cone-pulleys 4 and 5, as herein shown, have driving-surfaces, as at 6, the creeping of the band or belt upon the pulleys is reduced to a minimum or practically eliminated where comparatively narrow bands or belts are provided, and by the employment of the means comprising the intermediate sheave or pulley for increasing the arcs of engagement of the band or belt upon the driving and driven pulleys 4 and 5 it is evident that the narrow band or belt thus employed is given an increased bearing upon the cone-pulleys, such as could otherwise be obtained only by increasing the width of the band or belt, the engagement of said intermediate sheave or pulley 18 within the central bight 21 of said band or belt serving to draw the run or side of the band or belt wherein said central loop or bight 21 is produced in between the pulleys 4 and 5, so as to give the band or belt bearing on said pulleys around greater and increased arcs, as seen at 22 in Fig. 2.

As seen in Fig. 2, there is a toothed rack-bar 35 extended across the space between parts 1 1, parallel with the guide rods or bars 9 9, on which the frame or carriage 11 slides, the teeth of said rack-bar 35 being in mesh with those of a pinion 36 moving in unison with the carriage 11 and having a shaft or stud 37, on which is carried an eccentric 38, turning inside a strap or band, whereon is an arm 39, connected with the bracket 15, whereon the intermediate sheave or pulley 18 is held to turn. The proportions of the parts may be so arranged that a full turn of the pinion 36 will be accomplished by each full movement of the carriage 11 from one side of the main frame to the other, and the arrangement of the eccentric 38 on shaft 37 will be such that the extreme throw of said eccentric 38 will be accomplished at the center of the extent of travel of the carriage 11, or opposite the central point in the lengths of the cone-pulleys, whereby in the adjustment of carriage 11 from side to side of the main frame a tightening of the band or belt will be gradually effected as the same is shifted toward a central position with respect to the pulley-faces, while as the band or belt is shifted away from a central position relative to the pulley-faces said band or belt will be loosened, this tightening and loosening of the band or belt being automatically effected by the transverse sliding movement of bracket 15 across the path of the carriage 11.

The improved transmission apparatus constructed according to my invention is of an extremely simple and inexpensive nature and is especially desirable for use, since it permits of securing a comparatively great driving effect from a narrow band or belt, the disadvantageous feature of creeping common in similar devices being eliminated for all practical purposes.

Having thus described my invention, what I claim, and desire to secure by Letters Patent, is—

1. In combination with a pair of spaced pulleys, an endless band passed around the same and having a portion thereof bent inwardly to extend in said space, a sliding carriage, a bracket adjustable on the carriage a pulley carried on said bracket and engaging said inbent band portion, an arm carried by said bracket, an eccentric rotatably supported from said arm, a stud carried by said eccentric, a pinion carried by said stud, and a stationary rack-bar in mesh with said pinion.

2. In combination with a pair of spaced pulleys, an endless band passed therearound and having a portion thereof bent inwardly to extend in said space, a sliding carriage, a bracket movable on said carriage, a pulley carried by said bracket and engaging said inbent portion of the band, mechanism connected to said bracket for moving the latter transverse of the direction of movement of the carriage, and stationary means to engage said mechanism and operate the same when the carriage is moved.

3. In combination with a pair of spaced pulleys, an endless band passed therearound and having a portion thereof bent inwardly to extend in said space, a sliding carriage, a bracket movable on the carriage a pulley on said bracket engaging said inbent portion of said band, a rack, a pinion supported from said bracket and engaging said rack, and means for mounting said pinion whereby when said carriage is moved said bracket will be moved therewith and in addition in a plane transverse to that of said carriage.

Signed at Cincinnati, Ohio, this 13th day of April, 1905.

ERNST RICHTER.

Witnesses:
JOHN ELIAS JONES,
WILLIAM SCHUCHARDT.